Feb. 20, 1945.  J. B. WHITTED  2,370,101
ELECTRIC WINDSHIELD WIPER
Filed Dec. 11, 1941  3 Sheets-Sheet 2
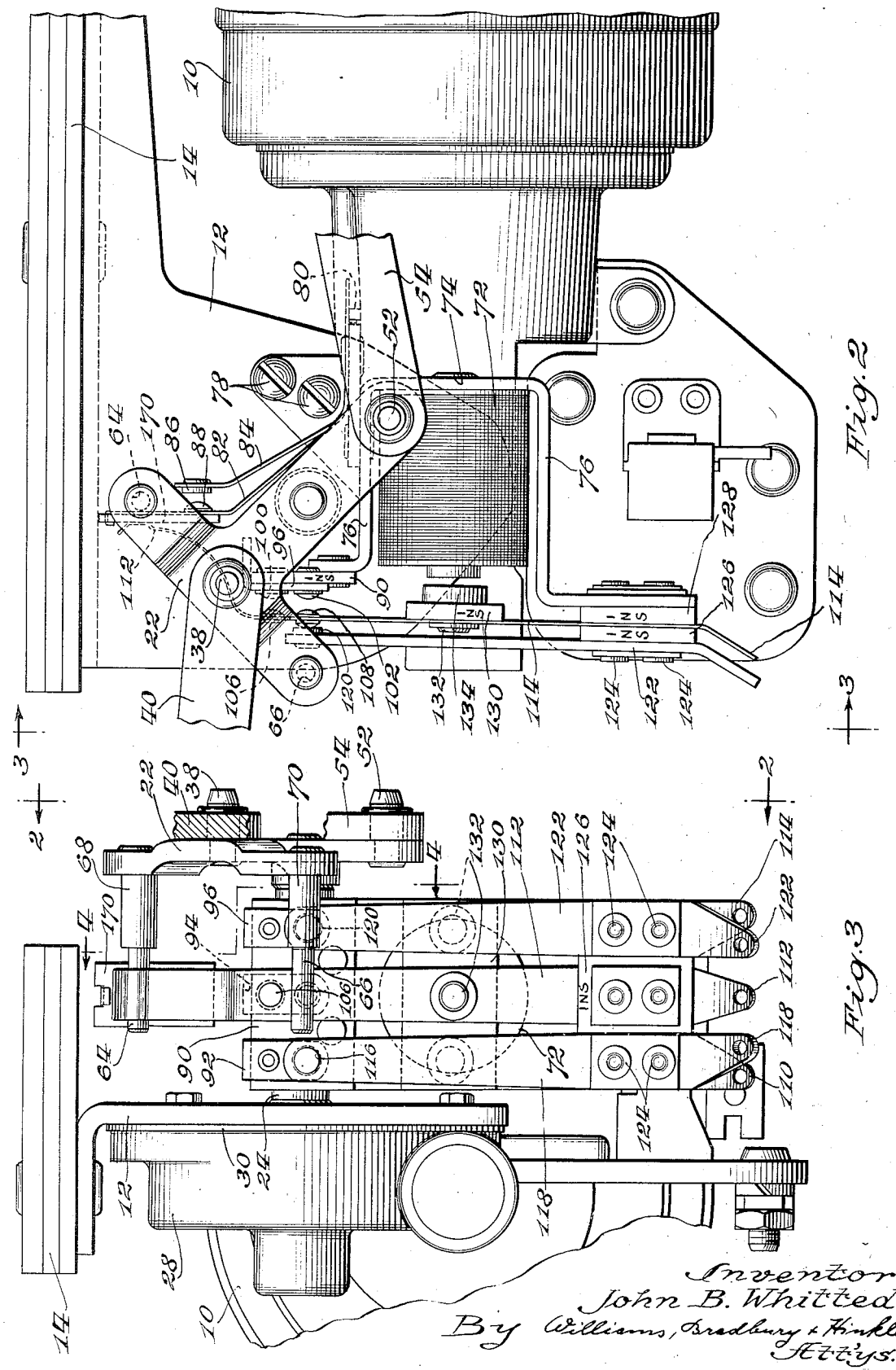
Inventor:
John B. Whitted
By Williams, Bradbury & Hinkle
Attys.

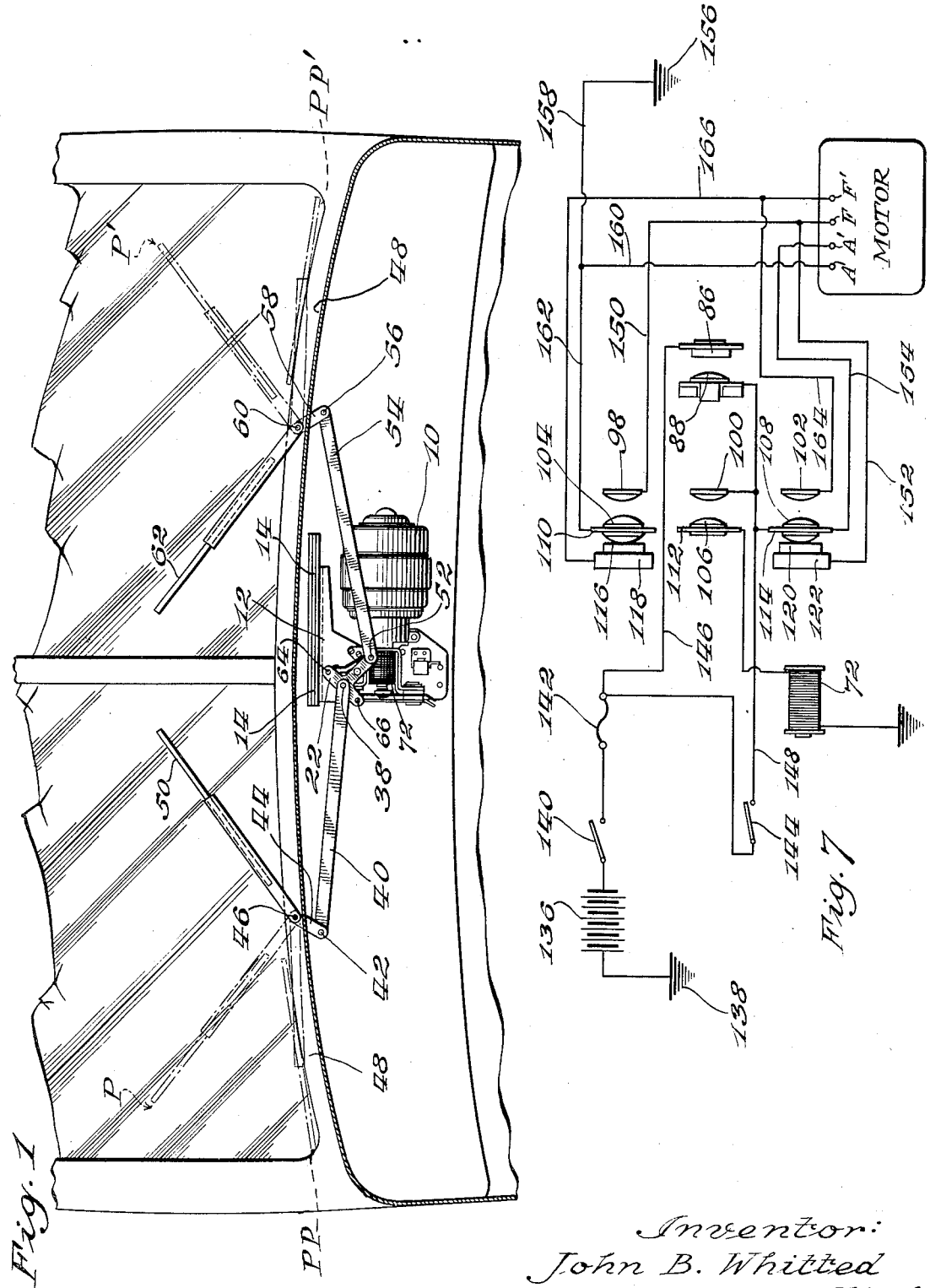

Feb. 20, 1945.    J. B. WHITTED    2,370,101
ELECTRIC WINDSHIELD WIPER
Filed Dec. 11, 1941    3 Sheets-Sheet 3
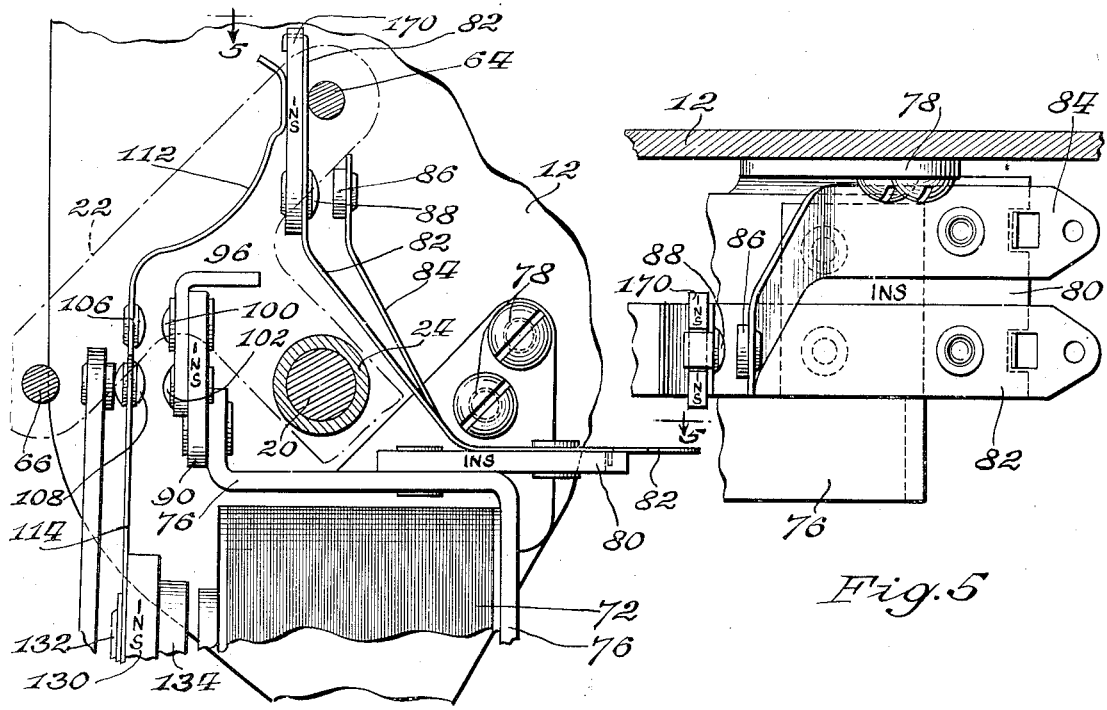
Fig. 4
Fig. 5
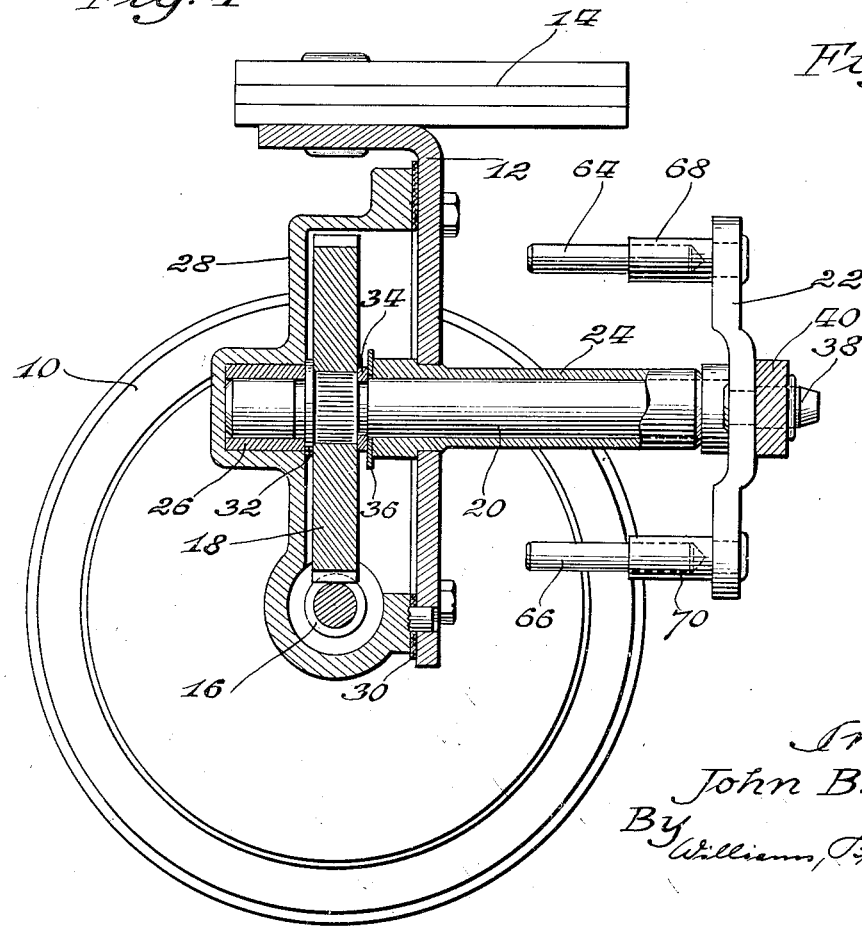
Fig. 6
Inventor:
John B. Whitted
By Williams, Bradbury & Hinkle
Att'ys.

Patented Feb. 20, 1945

2,370,101

UNITED STATES PATENT OFFICE 2,370,101

ELECTRIC WINDSHIELD WIPER

John B. Whitted, Glencoe, Ill., assignor to Stewart-Warner Corporation, Chicago, Ill., a corporation of Virginia Application December 11, 1941, Serial No. 422,479

9 Claims. (Cl. 15—253)

My invention relates to electric windshield wipers and is more particularly concerned with an improved driving mechanism whereby the windshield wiper may be parked in a position out of the line of vision of the driver of the automobile. My present invention is an improvement over that disclosed in my previous invention, Serial No. 386,490, filed April 2, 1941.

An object of my invention is to provide a new and improved electric windshield wiper which is of simple and inexpensive construction and wherein provision is made for parking the wiper blade in an inactive position out of the normal line of vision of the automobile driver.

Another object of my invention is to provide an electric windshield wiper wherein the direction of movement of the wiper blade is reversed by reversing the direction of rotation of the electric driving motor.

Another object of my invention is to provide a new and improved switching mechanism for electric windshield wipers.

Another object of my invention is to provide a new and improved circuit arrangement for electric windshield wipers.

Other objects and advantages of my invention will become apparent as the description proceeds.

In the drawings,

Fig. 1 is a front view of an automobile body to which my invention has been attached. Parts of the body are illustrated in section in order to show more clearly the mounting and general construction of my windshield wiper.

Fig. 2 is an enlarged front view of part of the driving mechanism shown in Fig. 1. This view may be considered as taken on the line 2—2 of Fig. 3 and looking in the direction indicated by the arrows.

Fig. 3 is a side elevation of the mechanism shown in Fig. 2 and is taken on the line 3—3 of Fig. 2.

Fig. 4 is an irregular sectional view of the switch mechanism and is taken on the line 4—4 of Fig. 3.

Fig. 5 is an irregular section through the switch mechanism taken on the line 5—5 of Fig. 4.

Fig. 6 is a sectional view of a portion of the driving mechanism.

Fig. 7 is a circuit diagram of the electrical connections.

Referring particularly to Fig. 1, it will be seen that I have illustrated an electric windshield wiper having a driving motor 10 mounted on a bracket 12, suitably attached to the body of the automobile. The bracket 12 is preferably provided with vibration dampening means 14 which prevent the transmission of vibration from the electric motor 10 and associated driving mechanism to the automobile body. The motor 10 drives a worm 16 (Fig. 6) through a driving connection of the kind disclosed in my said copending application, although any other suitable driving connection can be used in lieu thereof.

The worm wheel 18 is mounted on a shaft 20 carrying a T-shaped operating arm 22. The shaft 20 is journaled in a sleeve 24 mounted directly in the bracket 12 and also in a bearing sleeve 26 mounted in a casing 28, which cooperates with the bracket 12 to form a housing enclosing the worm and worm wheel. The casing 28 may be bolted or otherwise suitably secured to the bracket 12 and a gasket 30 is preferably interposed to provide a lubricant tight seal whereby the space surrounding the worm and worm wheel may be partly or completely filled with suitable lubricant.

The shaft 20 has a flange 32 which abuts the worm wheel 18 and determines the fixed position of this wheel lengthwise of the shaft. The split ring 34 is located in a groove in the shaft and is interposed between the worm wheel 18 and anti-friction washer 36 abutting the inner end of the sleeve 24.

The T-shaped operating arm 22 has a pin 38 pivotally connecting this arm to one end of a driving link 40 whose other end is pivotally connected at 42 to an arm 44 affixed to wiper blade shaft 46. This shaft 46 is suitably mounted in the windshield frame 48 or adjacent body part and carries wiper blade 50.

Operating arm 22 has a second pin 52 pivotally connected to one end of driving link 54, whose other end is pivoted at 56 to arm 58 fixed on wiper blade shaft 60. This shaft is likewise suitably supported in the windshield frame or adjacent body part and carries wiper blade 62. By suitably selecting the length of arms 44 and 58 the desired range of movement of the wiper blade can be obtained for any given oscillation of the operating arm 22. In the embodiment illustrated, the wiper blade has a normal operating range of 105° for a 90° oscillation of the operating arm 22.

The operating arm 22 carries a pair of switch operating pins 64 and 66 which are mounted in insulating bushings 68 and 70, respectively, attached to opposite ends of the head of the T-shaped operating arm 22. These pins 64 and 66 control switch mechanism which I shall now describe.

Referring particularly to Figs. 2, 4 and 5, it will be seen that I have provided an electric solenoid 72, mounted at 74 on a support 76 attached at 78 to the bracket 12. Above one end of the solenoid 72 a strip 80 of insulating material is attached to the support 76. A pair of switch members 82 and 84 are attached to this insulating strip 80, as most clearly shown in Figs. 4 and 5. The switch members 82 and 84 are made of sheet metal, the switch member 84 carrying a fixed contact 86 and the switch member 82 carrying a movable contact 88. The switch member 82 is resilient and the inherent resiliency of this member urges the movable contact 88 toward the fixed contact 86. These contacts are separated when pin 64 engages the upper end of switch member 82 and moves the contact 88 away from contact 86, as indicated in Fig. 4.

A second insulating strip 90 is attached to the support 76 above and adjacent the other end of the solenoid 72. This insulating strip 90 carries three stationary switch members 92, 94 and 96 having fixed contacts 98, 100 and 102, respectively. These fixed contacts are adapted to be engaged respectively by movable contacts 104, 106 and 108 mounted respectively on flexible switch fingers 110, 112 and 114.

Movable contact 104 is also adapted to engage a second fixed contact 116 carried by a rigid switch finger 118 and movable contact 108 is also adapted to engage a second fixed contact 120 carried by rigid switch finger 122. These flexible and rigid switch fingers are attached to the lower end of support 76 by pins 124, the rigid fingers being insulated from the flexible fingers by blocks 126 and the flexible fingers being insulated from the support 76 by insulating blocks 128, as indicated in Fig. 2.

A strip 130 of insulating material is attached to the three flexible fingers 110, 112 and 114 by rivets 132 and this insulating strip carries a metal armature 134 adapted to be attracted by the solenoid 72. The manner in which these various switch contacts are connected to the electrical circuits is most clearly shown in Fig. 7.

In Fig. 7 I have illustrated a conventional automobile battery 136 which is indicated as grounded to the automobile frame at 138. 140 is the usual ignition switch and 142 is an overload protecting device, such as a conventional fuse or circuit breaker. The manual switch 144 for controlling the operation of my novel windshield wiper is preferably connected to the automobile battery through the ignition switch 140 and overload protecting device 142. Stationary contact 86 is connected to the ignition switch and protecting device 142 by wire 146 and is a live contact whenever the ignition switch is closed.

Movable contact 108 and fixed contacts 88 and 100 are connected to manual switch 144 by wire 148 and are a live contact as long as this switch is closed. Fixed contacts 98 and 120 are connected to motor field terminal F by conductors 150 and 152, respectively. Wire 154 connects movable terminal 108 with motor armature terminal A'. Armature terminal A is grounded to the automobile frame at 156 by way of wires 158 and 160 and movable terminal 104 is connected to this same ground through wires 158 and 162. Fixed contacts 102 and 116 are connected to motor field terminal F' through wires 164 and 166, respectively.

The operation of my invention is as follows: With the parts in the position shown, closing of the ignition switch 140 will result in making fixed contact 86 a live contact. If now the manual switch 144, which constitutes the normal means for starting and stopping the windshield wiper, is moved to closed position, current will flow to movable contact 108 and thence through wire 154 to armature terminal A'. Armature terminal A is grounded through wires 160 and 158 so that a current is set up in the motor armature circuit. Current also flows from movable contact 108 to fixed contact 120 and thence by wire 152 to field terminal F. Field terminal F' is grounded through wire 166, fixed terminal 116, movable terminal 104 and wires 162 and 158, so that a current is likewise established through the motor field circuit and the motor starts to rotate.

Rotation of the motor drives worm 16, worm wheel 18, shaft 20 and operating arm 22. The wiper blades 50 and 62 are connected to the operating arm 22 in driving relationship therewith, so that oscillation of the operating arm 22 produces oscillation of the wiper blades 50 and 62.

Operating arm 22 carries switch actuating pins 64 and 66 and the initial movement of this arm and pin 64 in a clockwise direction permits movable contact 88 to engage fixed contact 86. This merely provides an additional connection between the battery and contacts 88, 100 and 108 and produces no new result.

As the wiper blades approach the dotted line positions P, P', switch actuating pin 66 engages the upper end of flexible finger 112 and bends this finger to bring movable contact 106 carried thereby into engagement with the live fixed contact 100. This energizes solenoid 72, which attracts armature 134 and bends flexible switch fingers 110 and 114. This results in movable contacts 104 and 108 breaking contact with fixed contacts 116 and 120, respectively, and engaging fixed contacts 98 and 102, respectively. This does not change the direction of flow of current through the motor armature, but reverses the flow of current through the field circuit and reverses the direction of rotation of the motor.

This reversal in motor rotation reverses the direction of rotation of the operating arm 22 and windshield wiper blades 50 and 62. The initial reversed movement moves switch actuating pin 66 out of engagement with the upper end of flexible switch member 112, but this does not break the engagement between movable contact 106 and fixed contact 100, since this flexible switch member 112 is maintained in flexed position by the attractive force of solenoid 72 on armature 134, which is attached to this flexible switch member, as well as to the other two flexible switch members. Continued movement of operating arm 22 brings switch actuating pin 64 into engagement with the upper end of switch member 82 and moves contact 88 out of engagement with contact 86 and also moves contact 106 out of engagement with contact 100, thus breaking the circuit through the solenoid 72 and permitting flexible switch fingers 110, 112 and 114 to return their movable contacts to the position shown in Fig. 7, thereby reversing the direction of motor rotation.

A strip 170 of insulating material is preferably attached to the upper end of switch member 82 to prevent a short circuit between this switch member and flexible switch finger 112. It will be understood that the upper end of switch finger 112 is sufficiently flexible so that any over travel of the pin 66 will merely bend these switch members without damaging them and they will return to normal positions as soon as the pin is removed by reverse rotation of the motor.

The foregoing operation of the windshield wiper continues as long as the ignition switch 140 and manual switch 144 remain closed. If it is desired to stop the windshield wiper, the manual switch 144 may be shifted to open position. This would ordinarily occur while contacts 86 and 88 are in engagement and would produce no immediate result, since contacts 100 and 108 remain in electrical communication with the battery through contacts 86 and 88 and wire 146.

As soon as switch actuating pin 64 engages the upper end of switch member 82 and moves contact 88 out of engagement with contact 86, all motor circuits are broken. At the same time solenoid 72 is deenergized and flexible switch fingers 110, 112 and 114 shift movable contacts 104, 106 and 108 to the position shown in Fig. 7, but this does not reverse the motor, since all motor circuits are disconnected from the battery. The motor, therefore, continues to coast under its own momentum and the wiper blades move to the parked positions indicated by dotted lines PP and PP', in which position the wiper blades come to rest either as a result of the frictional resistance of the windshield wiper mechanism itself, or as a result of the engagement of the wiper blades with the windshield frame. The wiper blades remain in this parked position until the control switch 144 is again closed.

If the control switch 144 should be opened after the contacts 86 and 88 have been separated by switch control pin 64 and while this pin is still moving in a counter-clockwise direction, the result will be the same as that described in the foregoing paragraph. If, on the other hand, the switch 144 should be opened while contacts 86 and 88 are closed but pin 64 is moved in a clockwise direction, the momentum of the parts would, under ordinary circumstances, be sufficient to permit the re-engagement of contacts 86 and 88, thus re-establishing the circuit to the motor and permitting the wiper blades to move through one complete cycle before stopping in the parked position. The chances that the switch 144 will be open while the pin 64 is moving in a clockwise direction and the contacts 86 and 88 are still separated, is extremely slight, but if the switch should be open during this brief period and if unusual conditions should result in the wiper blades coming to rest in the normal operating position, the driver need only close the switch 144 and immediately thereafter open it to cause the mechanism to shift the wipers to parked position.

While I have disclosed my mechanism as operating two windshield wipers through a predetermined arc having a determined relationship to a predetermined windshield, it will be understood that my invention may be utilized to operate any number of wiper blades through any described arcs and bearing any described relationship to a windshield or other surface to be wiped. My invention is not to be limited to the details shown and described and the scope of my invention is defined in the following claims.

I claim:

1. In a windshield wiper of the class described, the combination of a wiper blade, a motor for driving said blade, a driving connection between said motor and blade, electrical circuit means for said motor, switch means for reversing the direction of rotation of said motor, said switch means comprising a solenoid, an armature for said solenoid, resilient switch fingers attached to said armature for movement therewith, reversing switches for said motor operated by said fingers, an extension on one of said fingers, a solenoid switch controlled by said extension, means carried by said driving connection for moving said extension to close said solenoid switch, and other means carried by said driving connection for moving said extension to open said solenoid switch.

2. In an electric windshield wiper of the class described, the combination of a motor, a shaft driven by said motor, an operating arm attached to said shaft, links connecting said arm with windshield wiper blades, electric circuits for driving said motor in opposite directions, switch means for said circuits, and pins carried by said operating arm controlling said switch means.

3. In an electric windshield wiper of the class described, a combination of a reversible motor, windshield wiper means driven thereby, driving means connecting said wiper means with said motor, electrical circuits for said motor, switch means for controlling said circuits to operate said motor in either of two directions, an electro-magnet for moving said switch means in one direction, a pair of switches controlling said electro-magnet, means carried by said driving means for opening one of said switches, and other means carried by said driving means for closing the other of said switches.

4. In an electrical windshield wiper of the class described, the combination of a reversible motor, wiping mechanism operated thereby, a driving connection between said motor and wiping mechanism, circuit means for said motor, switch means for controlling said circuit means to operate said motor in either of two directions, said switch means comprising three resilient fingers, one of said fingers having an extension, a contact carried by each of said fingers, stationary contacts co-acting with the contacts of two of said fingers to control the direction of rotation of said motor, a magnet, a magnet circuit having a stationary contact adapted to engage the contact of said extension finger, an armature for said magnet connected to all of said fingers for moving said fingers, means carried by said driving connection to shift said extension and separate the contacts of said magnet circuit, and other means carried by said driving connection to shift said extension to engage said last-named contacts.

5. In an electric windshield wiper of the class described, the combination of a wiper blade and electric motor for driving said blade, driving means connecting said motor with said blade, switch means for reversing said motor and thereby determining the normal range of movement of said wiper blade, a manual switch for starting and stopping said wiper, and means for rendering said manual switch ineffective to cut off the current of said motor until the blade is in a position to be carried beyond its normal movement by the inertia of said motor and driving connection.

6. In an electric windshield wiper of the class described, the combination of a wiper, an electric motor for driving said wiper, means determining the normal range of movement of said wiper, a manual switch for starting and stopping said wiper, said motor normally having sufficient inertia to move said wiper beyond its normal range of movement, and automatic switch means effective except in a predetermined position of said wiping means to prohibit a cutting off of current to said motor by opening of said manual switch.

7. An electric windshield wiper of the class described, comprising in combination a wiper blade, an electric motor for driving said blade through a predetermined range of movement, driving means connecting said motor and blade, said motor and driving means having sufficient inertia in a certain position of said blade to move said blade beyond said predetermined range to a parking position outside of said range, and switch means controlling communication between said motor and a source of current, said switch means being effective to break communication between said motor and its source of current only when said blade is so positioned that the inertia of said driving means and motor will move the blade to said parking position.

8. An electric windshield wiper of the class described, comprising in combination a wiper blade, an electric motor for driving said blade through a predetermined range of movement, driving means connecting said motor and blade, said windshield wiper having sufficient inertia as a result of operation of said motor to shift said blade through a certain movement, and switch means controlling communication between said motor and a source of current, said switch means being effective to break connections between said motor and its source of current only when said blade is so positioned that said certain movement will carry said blade to a parking position outside of said range.

9. An electric windshield wiper of the class described, comprising in combination a wiper blade, a reversible electric motor for driving said blade through a predetermined range of movement, driving means connecting said motor and blade, automatic switch means for reversing the direction of movement of said motor, said motor and driving means having sufficient inertia at one limit of the predetermined range to move said blade beyond said predetermined range to a parking position outside of said range, and switch means controlling communication between said motor and a source of current, said switch means being effective to break said communication and permit movement of said blade beyond said predetermined range.

JOHN B. WHITTED.